United States Patent Office 2,895,956
Patented July 21, 1959

2,895,956
SYNTHESIS OF FUROQUINOLINE DERIVATIVES

Hans Tuppy, Vienna, Austria

No Drawing. Application September 9, 1957
Serial No. 682,642

7 Claims. (Cl. 260—289)

The present invention relates to a synthesis of furoquinoline derivatives, and more particularly to the synthesis of dictamines and γ-fagarines.

The alkaloid dictamine, also known as dictamnine, was isolated in 1923 by Thoms from the root of the *Dictamnus albus*. The alkaloid γ-fagarine was isolated in 1925 by Stuckert from *Fagara coco*.

Dictamine has marked pharmacological properties. Its activity is mainly connected with the smooth muscles. It contracts the uterus, in small concentration it increases the tonus of the heart muscles and in higher concentration it acts to contract the vessels.

Dictamine has the following structural formula:

(I)

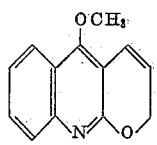

γ-Fagarine has the following structural formula:

(I')

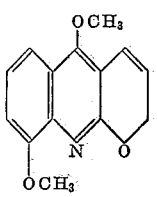

Despite the relatively simple structure of dictamine and γ-fagarine no suitable synthesis of these compounds has been devised prior to the present invention.

It is therefore a primary object of the present invention to provide a synthesis of dictamine and of γ-fagarine.

It is another object of the present invention to provide a method for the synthesis of dictamine and γ-fagarine which method can possibly also be used for the synthesis of other furoquinoline alkaloids of similar structure.

The present invention also provides for the synthesis of isodictamine which has the following structural formula:

(II)

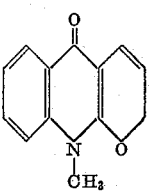

and also of iso-γ-fagarine which has the following structural formula:

(II')

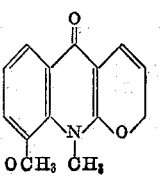

Other objects and advantages of the present invention will be apparent from a further reading of the specification and of the appended claims.

With the above objects in view, the process of the present invention for the production of dictamine or γ-fagarine mainly consists in the steps of heating phenylimido-tetron-α-carboxylic acid-ethylester or o-methoxyphenylimido-tetron-α-carboxylic acid-ethylester to cause ring closure and splitting off of ethanol to form the corresponding 4-hydroxy - 3-keto - 2,3-dihydro-furo(2,3-b)-quinoline or 8-methoxy-4-hydroxy-3-keto-2,3-dihydrofuro(2,3-b)-quinoline; treating the thus-formed products with diazomethane to produce the corresponding methylated compound (this reaction actually resulting in the production of a mixture of the methoxy compound and its analogous compound wherein the methyl group is attached to the nitrogen atom of the quinoline system, as will be more fully set forth later); treating the thus-formed derivative with phosphorus oxychloride to which some water is added to form the corresponding 3-chloro derivative; and catalytically hydrogenating the chlorinated derivative to replace the chlorine atom by hydrogen, preferably utilizing palladium on calicum carbonate as the catalyst, to form the corresponding dictamine (in admixture with isodictamine) or γ-fagarine (in admixture with iso-γ-fagarine).

In order to simplify the discussion of the synthesis of the present invention, the method will first be discussed with reference to the production of dictamine and isodictamine, and then the method will be discussed with respect to the production of γ-fagarine and iso-γ-fagarine, the synthesis actually being the same except for the use of a different starting material in both cases.

The starting material for the synthesis of dictamine in accordance with the method of the present invention is phenylimido-tetron-α-carboxylic acid-ethylester which has the following structural formula:

(III)

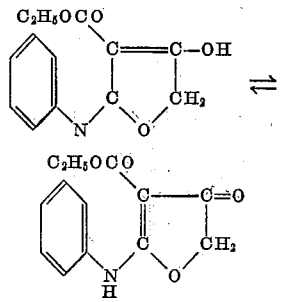

The starting material phenylimido-tetron-α-carboxylic acid-ethylester, Formula III, may be produced in accordance with the method of E. Benary, Ber. dtsch. chem. Ges. 45, 3682 (1912). In accordance with this method sodium malonic ester is reacted in ethereal suspension with chloro-acetyl chloride whereby the isotetron-carboxylic acid-diethylester having the following structural formula:

(IV)

$$\text{C}_2\text{H}_5\text{OCO}\diagdown\text{C}\text{---}\text{C--OH} \atop \text{C}_2\text{H}_5\text{O}\diagup\text{C}\diagdown\text{O}\diagup\text{CH}$$

is formed. It has been found of advantage, in contrast to the direction of Benary not to isolate this water-sensitive compound from the reaction mixture, but in the reaction mixture to directly convert it to the compound of Formula III by the addition of aniline and heating.

Phenylimido-tetron-α-carboxylic acid, Formula III dissolves quite easily in dilute alkalis. Its acid properties as well as the factors already set forth by Benary that it is impossible to indicate a keto group by reaction with phenyl hydrazine indicates that the compound is probably mainly in the form of an acid enol. It is of course possible by long action of hydroxylamine to produce a small amount of oxime.

The compound of Formula III, phenylamido-tetron-α-carboxylic acid, appears to have a perfect arrangement of groups for the building up of the linear furoquinoline skeleton. In fact, the ring formation which leads to the formation of the following compound:

(V) 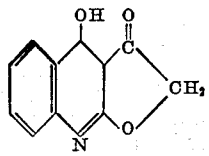

can easily be accomplished by thermal decomposition. The best conditions for the reaction which occurs with splitting-off of ethanol is heating of the tetronic acid derivation for a short time in paraffin oil at a temperature of about 280° C. or longer heating in boiling diphenyl ether.

The compound of Formula V possesses properties which indicate that it has a polar structure which is not expressed by its formulation as 4-hydroxy-3-keto-2,3-dihydro-furo (2,3-b)-quinoline. The compound can be crystallized only from polar solvents such as water, glacial acetic acid or dimethylformamide, while it is practically insoluble in non-polar solvents. It melts at above 300° C. with the composition. In addition, it exhibits a striking acid character. Sodium salts form already with sodium carbonate. Such marked acidity is not the rule with the phenolic hydroxyl groups. It can be assumed that the acidity of compound (V) cannot unequivocably be ascribed to an oxygen bound hydrogen atom since methylation with diazomethane produces a mixture in which in addition to the expected O-methyl derivatives of the following compound (VI):

(VI) 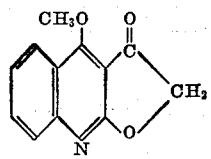

considerable quantities of the following compound (VII):

(VII) 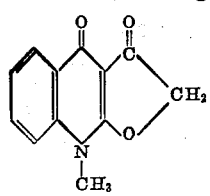

in which methylation occurs at the nitrogen atom are also present. The compound (VII) is even formed exclusively by reaction of compound (V) with dimethyl sulfate in alkaline solution or by the reaction of methyliodide on the silver salt of the compound (V).

A satisfactory explanation for the polar characteristics as well as for the acid properties and the readiness for methylation at the nitrogen atom is that compound (V) is neither present in large percentage in the form of compound (Va) nor in its tautomeric from (Vb), but rather as the Zwitter ion form (Vc); the alternative formation (Vd) must also be considered

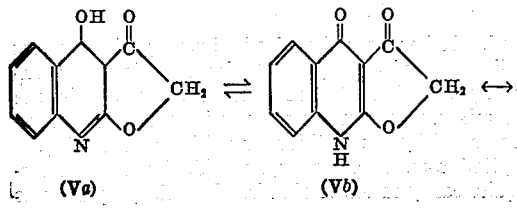

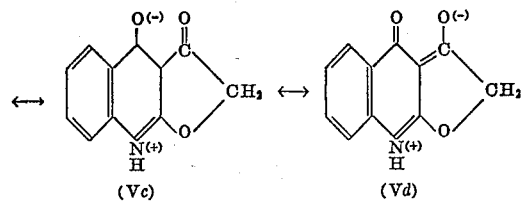

It is possible to consider the groupings:

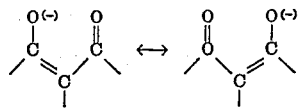

which appear in (Vc) and (Vd) as vinylog of the mesomeric carboxylate grouping:

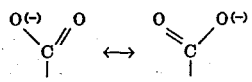

In this case as above a resonance stabilization of the polar ionized form combined with increased acidity would be accounted for. Then an anology between the polar formations of compound (V), actually (Vc) and (Vd), and the Zwitter ion structure of something like the α-amino acids becomes recognizable. As in the case of the amino acids which can be partially methylated at the nitrogen with diazomethane whereby betaines are formed, in the same manner the furoquinoline derivative discussed herein experiences, due to its Zwitter ion structure, a considerable degree of N-methylation.

Infra-red spectrum analyses were made of compounds (V), (VI) and (VII) (in solid condition) and the results thereof are summarized in the following table:

|  | Compound of formula V |  | Compound of formula VI |  | Compound of formula VII |  |
|---|---|---|---|---|---|---|
|  | $Cm.^{-1}$ |  | $Cm.^{-1}$ |  | $Cm.^{-1}$ |  |
| γC—H arom | 3,031 | w | 3,125 | w | 3,022 | w |
| γC—H aliph | 2,980 | w | 2,949 | w | 2,982 | w |
|  | 2,917 | m | 2,919 | m | 2,917 | w |
|  | 2,845 | w |  |  |  |  |
| (?) | 2,798 | w |  |  |  |  |
|  | 2,760 | w |  |  |  |  |
|  | 2,658 | w |  |  |  |  |
| C=O | 1,702 | vs | 1,715 | s | 1,706 | vs |
|  | 1,649 | s |  |  | 1,636 | s |
|  | 1,622 | m | 1,604 | vs | 1,606 |  |
|  |  |  |  |  | 1,594 | w |
| C=C and C=N of the ring | 1,577 | s | 1,561 | s | 1,546 | s |
|  | 1,535 | s | 1,507 | s | 1,521 | s |
| δCH₂ | 1,480 | s | 1,457 | s | 1,459 | s |
|  | 1,423 | m | 1,411 | w |  |  |
|  | 1,353 | w |  |  |  |  |

The following comments may also be made from the infra-red spectrum analyses. Compound (V) does not show in infra-red spectrum a normal OH or NH valence oscillation. The keto group of the furane ring is not enolized since the strong absorption at 1480 cm.⁻¹ is to be correlated to a δ-CH₂ oscillation. A further indication of the intact presence of the keto group of the furane ring is the strong CO-frequency at 1702 cm.⁻¹, which is rather close to the analogous CO-absorption of the compounds (VI) and (VII). If a bridge formation to the OH group would be present then the position of the CO-frequency as compared with compounds (VI) and (VII) would be further removed. The strong band at 1649 cm.⁻¹ in compound (V) may originate either from a CO group in the quinoline ring system (tautomeric form (Vb) analogous to compound (VII) whereby however an NH-frequency would have to be extraordinarily weak) which also may possess intermolecularly a bridge binding to NH, or it may originate from a

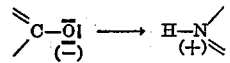

group. Polar structures may very well take form in the construction of the molecule (particularly in the tested solid condition) which is also indicated by the extraordinary intensity of the absorptions. The band group around 2700 cm.$^{-1}$ in compound (V) has not yet been fully identified. Possibly it originates from the active hydrogen atoms of the polar structures.

The reaction of compound (V) with diazomethane results in the formation of a mixture of the methylated products (VI) and (VII) from which the necessary 4-methoxy - 3 - keto - 2,3 - dihydrofuro(2,3 - b) - quinoline, compound (VI), can be separated by sublimation.

Compound (VI) can be converted to 3-chloro-4-methoxy-furo(2,3-b)-quinoline:

(VIII) 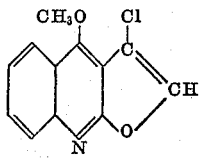

by means of phosphorus oxychloride to which some water is added. The reaction will not occur if water-free phosphorus oxychloride is utilized.

Attempts to produce the chloromethoxyfuroquinoline, compound (VIII), in other ways, by the conversion of 3,4-dichloro-furoquinoline with sodium methylate were unsuccessful since the two chlorine atoms of this compound have practically the same reaction capability so that the resulting product consists of a mixture of more or less similar compounds from which compound (VIII) cannot be isolated.

The chlorine atom of compound (VIII) can be replaced by hydrogen by means of catalytic hydrogenation with palladium on calcium carbonate as catalyst. The thus obtained substance is dictamine; it is identical with the alkaloid which is isolated from white dittany, which was proved by analysis, mixed melting point, comparison of the ultra-violet spectrums, and paper chromatographic behavior.

Isodictamine, compound (II), which is an isomer of the alkaloid, which can easily be obtained by heating dictamine, compound (I), with methyl iodide, can be obtained in an analogous manner by catalytic reduction of 9,methyl - 3 - chloro - 4 - keto - 4,9 - dihydro - furo-(2,3-b) quinoline:

(IX) 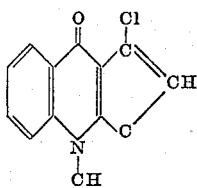

which can be obtained by heating compound (VII) with phosphorus oxychloride and some water.

The synthesis for the production of dictamine and isodictamine in accordance with the method of the present invention may be summarized by the following chart:

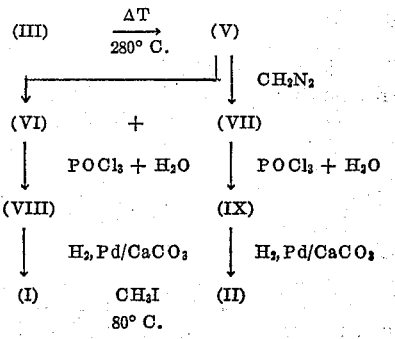

The following example will describe the complete synthesis of dictamine and isodictamine in accordance with the present invention. The scope of the invention is of course not meant to be limited to the specific details of the example.

*Example 1*

16 g. ($\frac{1}{10}$ mol) of freshly distilled and dried malonic acid diethylester are dissolved in 120 cc. of absolute ether and reacted with 2.3 g. of sodium ($\frac{1}{10}$ mol) in the form of finely cut discs. The mixture which becomes warm with the development of hydrogen remains standing at room temperature for 3 to 4 days. It is necessary from time to time to press the sodium malonic ester which forms in gelatinous state from the ether under the surface of the liquid and to crush the not yet utilized sodium metal. When no non-utilized metal is present 5.64 g. (4.0 cc.) of chloroacetyl chloride ($\frac{1}{20}$ mol) is quickly added dropwise to the ether suspension of the sodium malonic ester under rotation and cooling with ice water. The reaction mass gradually becomes colored yellow and changes into the form of a thinly liquid slurry. After standing for ½ hour at room temperature the reaction mass is heated for 15 minutes on a water bath to boiling under refluxing in order to fully complete the reaction. 6 cc. of freshly distilled aniline is then added thereto and the reaction mass is heated for 2 hours. It is then cooled, water is added thereto and it is shaken carefully in a separatory funnel. The aqueous layer, in which the salt is dissolved, is rejected. From the ether solution, which has advantageously been somewhat concentrated and stored in an icebox, yellow crystals of phenylimido-tetron-α-carboxylic acid-ethylester are separated in rather pure form. A further amount can be obtained from the ethereal mother liquor by shaking the same 3 to 4 times with 1 n NaOH and acidification of the alkaline liquid, this further amount being obtained in somewhat less pure form. This product is after partial purification by cooking with a small amount of ether suitable for further working-up. The yield amounts to a total of about between 2.3 and 5.7 (on the average 30% to the theoretical). The melting point is 116–117° C. The compound corresponds to Formula III.

10 g. of this compound are heated in 100 g. of diphenyl ether in a round bottomed flask provided with a rising tube with the aid of a metal bath maintained at 270° C. for a total of 40 minutes. The ring closing reaction follows with the vigorous development of gas. Ethyl alcohol vapors escape from the end of the rising tube and a dark brown solid mass separates on the walls of the flask. After cooling the diphenyl ether is diluted with 250 cc. of diethyl ether, the solid product from the flask walls which are suspended in the ether mixture is filtered off by suction and washed with ether. The yield on the rather impure crude product amounts to about 7.5 g. The product corresponds to Formula V.

If the thermal decomposition of compound (III) is carried out in paraffin oil instead of in diphenyl ether, it is convenient to work in small portions. 1 g. of the compound of Formula III is added to 25 cc. of paraffin oil which is heated to about 260–280° C. The temperature is then increased as rapidly as possible to 290–300° C. and kept at this higher temperature for 3 to 4 minutes. After cooling 25 cc. of ethyl ether are added, the undissolved brown substance is filtered off under suction and washed with ethyl ether. The yield of the crude product is about the same as that obtained with the use of diphenyl ether, the compound being the same, namely compound (V).

The working-up of the crude product can be carried out in two different ways. In one way it is extracted for 24 hours in a Soxhlet-apparatus with ether, in order to dissolve out any non-converted compound (III) and the ether insoluble main amount is drawn off with boiling hot water in which compound (V) is slightly soluble and the impurities are practically insoluble. Compound (V) is crystallized from the hot aqueous solution in relatively pure form as small leaf-like particles.

The other method for purifying the crude product utilizes a sodium salt which is difficultly soluble in cold sodium hydroxide solution. The dark brown mass which is obtained by the thermal decomposition of the 10 g. of compound (III) four times, each time with 25 cc. of 1 n NaOH. A practically black, sticky product remains undissolved. The sodium salt of compound (V) is obtained in the form of brownish yellow needles from the united alkaline extracts which were first hot filtered through a sintered glass Büchner funnel, the crystals separating after the addition of 160 cc. of ethanol upon cooling and prolonged standing in a cooling chamber such as an icebox. This is filtered-off by suction and washed with alcohol. If it is dissolved in boiling water and acidified with dilute hydrochloric acid compound (V) is obtained in the form of a slightly brownish colored finely crystalline powder. The yield corresponds on the average to 50%; the highest achieved corresponding to 71%.

4-hydroxy-3-keto-2,3-dihydro-furo(2,3-b) quinoline is insoluble in non-polar solvent. On the other hand it can be crystallized from large amounts of ethanol, glacial acetic acid or water, though with large losses. It is obtained from hot alcohol in the form of cubes and from glacial acetic acid and water in the form of leaves. Dimethylformamide is a particularly good solvent for compound (V) and this compound separates upon cooling slowly in the form of lumpy crystals.

Compound (V) dissolves easily in dilute lyes, in sodium carbonate solution and even in strong sodium hydrogen carbonate solutions and can be again precipitated therefrom by acids. The solutions in water and in alkalis show a strong violet fluorescence.

The compound melts first with approximate decomposition at 320° C. In high vacuum it can to some extent be sublimed at 250–280° C. The formula is $C_{11}H_7O_3N$. Calculations give the following values: C=65.67%, H=3.51%, N=6.96%. The values found upon analysis are as follows: C=65.71%, H=3.69%, N=6.87%, 6.95%.

530 mg. of compound (V) are dissolved in 25 cc. of 2 n KOH and shaken with 7.0 g. of dimethyl sulfate for a total of ½ hour, the dimethyl sulfate being added in two portions. This results in the separation of 527 mg. of the N-methyl derivative corresponding to Formula VII, the same being colored light red. For purification purposes the compound is treated one time with hot water with the aid of animal charcoal, two times with glacial acetic acid and subsequently recrystallized from water. The melting point is 310–313° C. with decomposition. The formula of the compound is $C_{12}H_9O_3N$. Calculations give the following values: C=66.97%, H=4.22%. The values found upon analysis are as follows: C=67.02%, H=4.27%.

The sodium salt of compound (V) is formed in crystalline condition by taking up 1.0 g. of compound (V) in hot aqueous sodium hydroxide and adding ethanol. This sodium salt (1.25 g.) is dissolved in 15 cc. of water and reacted with 1.7 g. of silver nitrate in 5 cc. of water. The separated precipitate of the silver salt is dried (1.33 g.), finely rubbed with 3 cc. of ether and wetted with 1.5 cc. of methyl iodide and allowed to stand at room temperature in the dark for 48 hours. In order to try to form the O-methyl derivative corresponding to compound (VI), the reaction product after evaporation of excess methyl iodide is extracted several hours with ether. However compound (VI) cannot even be isolated in traces. On the contrary, cooking of the ethereal insoluble mass with glacial acetic acid and concentration of the extract results in 589 mg. (65% of the theoretical) of the N-methyl compound (VII) being formed in the form of light yellow needles which upon recrystallization from glacial acetic acid are pure upon analysis. The formula of this compound is $C_{12}H_9O_3N$. Calculations give the following values: C=66.97%, H=4.22%. The values upon analysis are as follows: C=66.73%, 66.88%; H=4.21%, 4.29%. No methyl iodide is split from compound (VII) upon treatment with boiling hydroiodic acid.

The actual methylation of compound (V) by means of diazomethane proceeds as follows:

A suspension of 1 g. of finely pulverized compound (V) in 200 cc. of absolute methanol is reacted with an ethereal diazomethane solution produced from 10 g. of nitrosomethylurea, the solution being added in six portions and the reaction being carried out at 0° C. The mixture, after the last addition is allowed to stand an additional ½ hour at 0° C. and if necessary a small amount (between 0 to 100 mg.) of still undissolved product is filtered-off by suction, the clear filtrate is evaporated to dryness in a water stream vacuum at a temperature which is not more than 30° C. and the remaining red to blue violet colored mass is dissolved in 10–12 cc. of hot ethanol. Dark red needles precipitate upon cooling. If overheating is avoided, (bath temperature of 120–140° C.) and small portions are added, it is possible to sublime out of the red methylated product under vacuum of a mercury pump the O-methyl compound (VI) as a white crystalline powder with a melting point of 152–159° C. (yield between 215 and 402 mg., which corresponds to 20–38% of the theoretical). Compound (VI) is very easily soluble in alcohol, quite soluble in ether, while on the other hand being insoluble in water and in lyes. The methyl group slowly splits off upon cooking with hydroiodic acid. Upon repeated recrystallizations from ethanol the melting point is increased to 159–161° C., the melting point not however being completely sharp, since compound (VI) at higher temperatures is converted to the isomer compound (VII) with transfer of the methyl group from the oxygen to the nitrogen. The formula of compound (VI) is $C_{12}H_9O_3N$. Upon calculation the following values are obtained: C=66.97%, H=4.22%. Upon analysis the following values are found: C=67.03%, H=4.00%.

Upon sublimation of the red methylated product a red-brown crystalline powder remains. If this is recrystallized from a small amount of glacial acetic acid and then with a large amount of hot water with the application of animal charcoal, compound (VII) is obtained in pure condition in the form of long white spears or glass wool-like fibers. The formula of the compound is $C_{12}H_9O_3N$. Calculation gives the following values: C=66.97%, H=4.22%. Values upon analysis are as follows: C=67.09%, H=4.27%.

The following paragraph describes the conversion of compound (VI) to compound (VIII):

Dry air is forced by suction for 1 hour under cooling through an already prepared mixture, prepared under cooling, of 24 cc. of $POCl_3$ and 0.9 cc. of water in order to remove excess hydrogen chloride. 350 mg. of compound (VI) are then introduced and the solution is heated for 2½ hours in a metal bath under refluxing at boiling temperature. After distilling-off excess $POCl_3$ at 40° C. under vacuum, 40 cc. of water are added under cooling to the oily residue. The addition of sodium carbonate until the reaction mass is weakly alkaline results in precipitation of chloromethoxy-furo quinoline. After standing for several hours the light yellow flocculation is filtered-off by suction, dried (345 mg.) and sublimated at 110–120° C. under 0.04 mm. Hg. After recrystallization of the white sublimate (235 mg.; 62% of the theoretical) from ethanol, the melting point is found to be 117° C. The formula of the formed compound is $C_{12}H_8O_2NCl$. The calculated amount of chlorine is 15.18% and the amount found by analysis is 15.19%, 15.23%. The production of compound (VIII) by means of pure $POCl_3$ without the addition of water does not occur.

The following paragraph describes the production of compound (IX) from compound (VII):

450 mg. of compound (VII) are heated to refluxing for 2 hours at a temperature of 120–130° C. with 30 cc. of water-containing $POCl_3$-chloride (prepared as above). The non-utilized $POCl_3$ is evaporated off under vacuum at low temperature, the residue is mixed with water and the aqueous solution neutralized with sodium carbonate. The crystallized product (410 mg.) is purified by sublimation (120–150° C. at 0.05 mm. Hg). 321 mg. (66% of the theoretical) of compound (IX) are obtained having a melting point of 185–190° C. After recrystallization two times from ethanol the melting point of compound (IX) is found to be 189–190° C. The empirical formula of the compound is $C_{12}H_8O_2NCl$. The calculated amount of chlorine is 15.18% and the amount found upon analysis is 14.96%.

The following paragraph describes the conversion of compound (VIII) to dictamine, compound (I):

100 mg. of Pd—$CaCO_3$ as catalyst is utilized for the hydrogenation of 210 mg. of compound (VIII) dissolved in 150 cc. of pure ethanol. During a time period of about 3 hours at a temperature of 17° C. approximately 103% of the theoretical amount of hydrogen is utilized. After evaporation of the alcoholic solution under vacuum at 40° C. a white crystalline residue remains which upon sublimation (110° C. at 0.03 mm. Hg) amounts to 146 mg. (81.3% of the theoretical) of crude dictamine in the form of a white, loose crystalline powder having a melting point of 121–131° C. Upon recrystallization two times from ethanol or ethanol/water the melting point increases to 134–135° C. The thus-produced synthetic dictamine when mixed with natural dictamine obtained from Dictamnus albus does not result in any lowering of the melting point. The empirical formula of the compound is $C_{12}H_9O_2N$. The following values are obtained by calculation: C=72.35%, H=4.55%, N=7.03%. The values found upon analysis are as follows: C=72.63%, H=4.69%, N=7.28%. Comparison of the thus-formed compound under ultra-violet spectrum and by means of paper chromatography with naturally obtained dictamine show that the two are identical.

The following paragraph describes the conversion of compound (IX) to isodictamine, compound (II):

10 mg. of compound (IX) in 7.5 cc. of pure alcohol are hydrogenated utilizing 10 mg. of a 10% Pd—$CaCO_3$ catalyst until the theoretical amount of hydrogen is taken up (after 33 minutes). The alcoholic solution is evaporated to dryness, the residue digested with cold water to remove calcium chloride, and the compound is then recrystallized from a small amount of hot water. After sublimation two times (150–160° C. at 0.005 mm. Hg) and dissolution in water and crystallization therefrom pure isodictamine, compound (II), is obtained. The melting point is 185–187° C. No depression of the melting point is found upon mixing with isodictamine produced from natural dictamine obtained from Asahina.

The synthesis of γ-fagarine in accordance with the method of the present invention proceeds in substantially the same manner as the synthesis of dictamine which was set forth above. Thus, the synthesis proceeds as follows:

O-methoxyphenylimido-tetro-α-carboxylic acid-ethylester having the following formula:

(III')

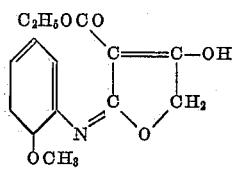

is heated until ethanol is split off and the ring is closed, preferably in paraffin oil at a temperature of about 305°

C., to form 8-methoxy-4-hydroxy-3-keto-2,3-dihydro-furo(2,3-d) quinoline having the following formula:

(V')

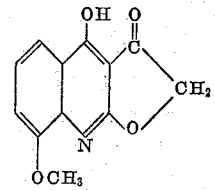

and this compound is reacted with diazomethane. This reaction results in the formation of 4,8-dimethoxy-3-keto-2,3-dihydro-furo(2,3-d) quinoline having the following structure:

(VI')

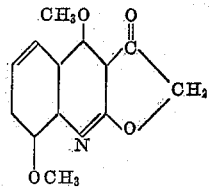

and 8-methoxy-9-methyl-3,4 - dioxo - 2,3,4,9 - tetrahydro-furo(2,3-b) quinoline having the following structure:

(VII')

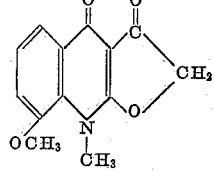

The reaction of compound (VI') with phosphorus oxychloride to which a small amount of water has been added results in the formation of 3-chloro-γ-fagarine having the following structure:

(VIII')

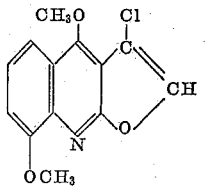

and reduction of this compound with hydrogen utilizing palladium-calcium carbonate as catalyst results in the formation of γ-fagarine, compound (I').

The reaction of compound (VII') with phosphorus oxychloride to which a small amount of water has been added results in the formation of 3-chloro-iso-γ-fagarine having the following structure:

(IX')

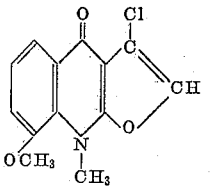

and reduction of this compound with hydrogen utilizing palladium-calcium carbonate as catalyst results in the formation of iso-γ-fagarine, compound (II').

Thus, the production of γ-fagarine and iso-γ-fagarine may be summarized as follows:

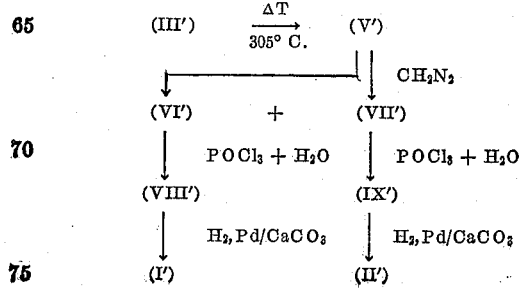

The following example describes the synthesis of γ-fagarine and iso-γ-fagarine in accordance with the present invention, the scope of the invention of course not being limited to the specific details of the Example.

Example 2

7.0 g. of sodium metal are finely powdered in hot xylol by means of a vibro-mixer. The xylol is decanted from the metal and removed by washing with absolute ether. 48 g. of freshly distilled malonic acid diethylester which had been dried over calcium chloride is quickly allowed to drop into a suspension of the sodium powder in 400 cc. of absolute ether under the exclusion of air moisture. After 12 hours of stirring at room temperature the formation of the sodium malonic ester is completed. 13.0 cc. of chloroacetyl chloride is added dropwise relatively quickly to the ice-cooled and stirred ethereal suspension. The mixture is then allowed to stand for one-half hour at room temperature, it is refluxed for 20 minutes on a water bath and after the addition of 21 cc. of o-anisidine it is heated to boiling for an additional 2 hours.

After cooling, the reaction mixture is shaken with 200 cc. of water in order to remove the inorganic salts therefrom. 6.6 g. of compound (III') crystallizes in the cold from the concentrated ethereal solution. An additional 5.0 g. can be obtained from the ethereal mother liquor by shaking four times, each time with 20 cc. of 0.5 n NAOH and acidification of the purified alkaline extract with HCl (total yield about 28% of the theoretical). After recrystallization two times from pure alcohol and one time from dilute alcohol the by this time colorless compound (III') melts at 178° C. The empirical formula of compound (III') is $C_{14}H_{17}O_5N$. Upon calculation the following is found: C=60.64%, H=5.45%, N=5.05%. Upon analysis the following values are found: C=60.71%, H=5.47%, N=5.22%.

The following paragraph describes the conversion of compound (III') to compound (V'):

It was found convenient to carry out the thermal conversion of compound (III') to compound (V') in small portions. 1 g. of finely powdered compound (III') is quickly introduced into 25 cc. of paraffin oil heated to 270° C.; the temperature is then raised as quickly as possible to 305° C. and kept at this temperature for 60–75 seconds. The flakes of compound (VI') which separate from the cool solution which has been diluted with 25 cc. of ether are filtered off under suction and washed with ether to completely remove the paraffin oil. The crude compound (VI') still contains small amounts of non-converted starting material which can be separated by extraction for several hours with ether in a Soxhlet-apparatus. The ether insoluble crude product is then extracted in an extractor with hot water. Compound (VI') crystallizes from the aqueous solution in rather pure form as long, golden yellow spears (yield: 57% of the theoretical; melting point 300–314° C. under decomposition). Compound (VI') is easily soluble in pyridine and dimethylformamide and quite soluble in warm glacial acetic acid, alcohol and large amounts of hot water. After recrystallization two times from water and drying at 150° C. the crystalline mass having the appearance of white glass wool melts at 312–318° C. under dark coloring and decomposition. The compound corresponds to formula (V'). The empirical formula of the compound is $C_{12}H_9O_4N$. Upon calculation the following values are obtained: C=62.33%, H=3.92%, N=6.06%. Upon analysis the following values are found: C=62.14%, H=4.40%, N=6.27%.

The following paragraph describes the conversion of compound (V') to compounds (VI') and (VII'):

A solution formed from 20 g. of nitrosomethylurea and ethereal diazomethane solution (200 cc.) is introduced into a solution of 1.33 g. of compound (V') in 800 cc. of methanol cooled to 0° C. during a time period of one hour. After 2 hours of reaction of the methylation agent the solvent is distilled off under vacuum at 30–35° C. Compound (VI') can be leached out of the residue by several hours of stirring with 200 cc. and subsequently with 75 cc. of benzene. The purified yellow benzene solution leaves behind a red-brown solid residue upon removal of the solvent, the residue amounting to 646 mg. Upon recrystallization of the residue from a small amount of ethanol 221 mg. of compounds (VI') (16% of the theoretical) in the form of light-red needles having a melting point of 207–220° C. are obtained. After dissolving and recrystallization from a small amount of benzene and from acetic ester compound (VI') analyzes pure. The by this time light yellow needles melt at a temperature of 224–226° C. The empirical formula of the compound is $C_{13}H_{11}O_4N$. Upon calculation the following values are obtained: C=63.60%, H=4.52%. Upon analysis the following values are obtained: C=63.73%, H=4.44%.

The portion of the methylated product that is not dissolved in the benzene is recrystallized two times from hot water utilizing animal charcoal and subsequently from acetic ester, whereby the N-methyl compound (VII') is obtained in a yield of 28% of the theoretical in the form of needles which melt under decomposition though not sharply. The empirical formula of the compound is $C_{13}H_{11}O_4N$. Calculations give the following values: C=63.60%, H=4.52%. Upon analysis the following values are found: C=63.63%, H=4.41%.

The following paragraphs describe the conversion of compound (VI') to compound (VIII') and of compound (VII') to compound (IX'):

Compound (VI') with 100–120 times its amount of a mixture of 30 parts by volume of $POCl_3$ and one part of water is heated for four hours under refluxing at a bath temperature of 110° C. Excess chlorination agent is distilled off under reduced pressure and the very viscous residue is poured onto ice. After the addition of sodium carbonate until the reaction mixture is slightly alkaline, the gray colored crude product is filtered off by suction, washed well with water, dried, and sublimed at a bath temperature of 140–145° C. under 0.001 mm. Hg. The white sublimate of compound (VIII') which is obtained in a yield of 41% of the theoretical is found to analyze pure after recrystallization from benzol-petroleum ether and out of a very small amount of alcohol. It melts at 120–121° C. or (in another modification) at 137–138° C. The empirical formula is $C_{13}H_{10}O_3NCl$. The chlorine content upon calculation is 13.45%, and upon analysis found to be 13.88%.

In an analogous manner compound (VII') can be chlorinated to compound (IX'). The yield in this case after sublimation at 160–170° C. under 0.001 mm. Hg is 61% of the theoretical and the melting point after dissolution of the sublimate and recrystallization of the same from ethanol is 223–224° C. The empirical formula is $C_{13}H_{10}O_3NCl$. The chlorine content upon calculation is 3.45% and upon analysis is found to be 13.22%.

The following paragraph describes the conversion of compound (VIII') to compound (I'), i.e. γ-fagarine:

61 mg. of compound (VIII') are dissolved in 70 cc. of pure ethanol and reduced with hydrogen utilizing a $Pd/CaCO_3$-catalyst. After one hour the amount of hydrogen taken up is approximately the theoretical and the hydrogen take-up comes practically to a standstill. After the distillation off of the ethanol the remaining oily residue is digested with 7 cc. of water in order to remove calcium chloride, whereby the residue solidifies. By distillation in a bulb tube at 140–170° C. under 0.001 mm. Hg the hydrogenation product is obtained in the form of a colorless oil which quickly solidifies in the form of crystals (45 mg.). Repeated dissolutions and crystallizations from ethanol, benzol/petroleum ether and dilute alcohol results in the obtention of compound (I'), i.e. γ-fagarine having a melting point of 138–140° C. The empirical formula of the compound is $C_{13}H_{11}O_3N$. The following values are obtained upon calculation: C= 68.12%, H=4.80%, N=6.11%. Upon analysis the following values are obtained: C=68.15%, H=4.62%, N=6.30%. The synthetic product does not lower the melting point of the natural γ-fagarine. Furthermore, ultra-violet spectrum analysis proves that the synthetic compound is identical with the naturally obtained alkaloid.

The following paragraph describes the conversion of compound (IX') to compound (II'), i.e. iso-γ-fagarine:

78 mg. of compound (IX') upon catalytic reduction with $Pd/CaCO_3$ (90 mg., 10%) as catalyst in 90 cc. of ethanol solution take up during a reaction time of 1½ hours 90% of the theoretical amount of hydrogen. After distilling off the alcohol, the remaining crude iso-γ-fagarine is freed of calcium chloride by treatment with a small amount of water, and upon recrystallization from benzol-petroleum ether, from pure and diluted methanol, and then by sublimation in a bulb tube at 170–180° C. under 0.005 mm. Hg is purified. The melting point is 177–179° C. The empirical formula of the compound is $C_{13}H_{11}O_3N$. Upon calculation the following values are obtained: C=68.12%, H=4.80%, N=6.11%. Upon analysis the following values are found: C=67.94%, H=4.97%, N=5.97%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a compound selected from the group consisting of dictamines and γ-fagarines, comprising the steps of heating a compound selected from the group consisting of

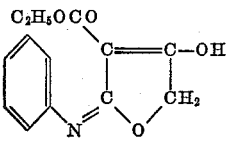

and

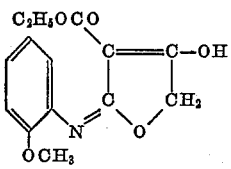

for a time and at a temperature sufficiently high to cause ring closure and splitting-off of ethanol; treating the thus-formed closed ring compound with diazomethane so as to methylate the same; treating the thus-methylated compound with phosphorous oxychloride and water so as to chlorinate the same; and reducing the thus-chlorinated compound with hydrogen so as to form the corresponding compound selected from the group consisting of dictamines and γ-fagarines.

2. A method of producing a compound selected from the group consisting of dictamines and γ-fagarines, comprising the steps of heating a compound selected from the group consisting of

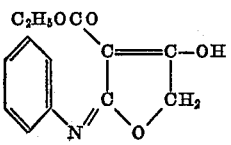

and

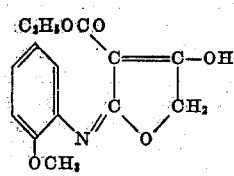

for a time and at a temperature sufficiently high to cause ring closure and splitting-off of ethanol; treating the thus-formed closed ring compound with diazomethane so as to methylate the same, thereby forming the corresponding O-methyl and N-methyl compounds; separating said O-methyl compound from said N-methyl compound; treating the thus-separated O-methyl compound with phosphorous oxychloride and water so as to chlorinate the same; and reducing the thus-chlorinated compound with hydrogen so as to form the corresponding compound selected from the group consisting of dictamine and γ-fagarine.

3. A method of producing a compound selected from the group consisting of dictamines and γ-fagarines, comprising the steps of heating a compound selected from the group consisting of

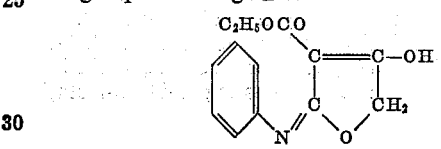

and

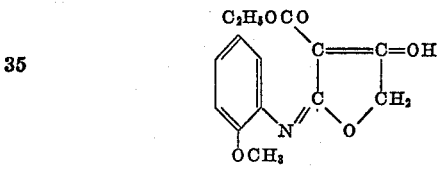

for a time and at a temperature sufficiently high to cause ring closure and splitting-off of ethanol; treating the thus-formed closed ring compound with diazomethane so as to methylate the same, thereby forming the corresponding O-methyl and N-methyl compounds; separating said O-methyl compound from said N-methyl compound; treating said N-methyl compound with phosphorous oxychloride and water so as to chlorinate the same; and reducing the thus-chlorinated compound with hydrogen so as to form the corresponding compound selected from the group consisting of iso-dictamine and iso-γ-fagarine.

4. A method of producing a dictamine, comprising the steps of heating

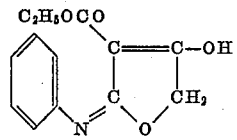

at a temperature of about 270–300° C. so as to cause ring closure and splitting-off of ethanol; treating the thus-formed closed ring compound with diazomethane so as to methylate the same; treating the thus-methylated compound with phosphorous oxychloride and water so as to chlorinate the same; and reducing the thus-chlorinated compound with hydrogen so as to form a dictamine.

5. A method of producing a dictamine, comprising the steps of heating

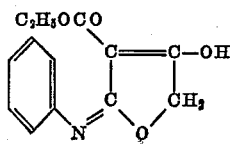

distributed in a substance selected from the group consisting of paraffin oil and diphenylether at a temperature of about 270–300° C. so as to cause ring closure and splitting off of ethanol; treating the thus-formed closed ring compound with diazomethane so as to methylate the same, thereby forming the corresponding O-methyl and N-methyl compounds; separating said O-methyl compound from said N-methyl compound by sublimation; treating the thus-separated O-methyl compound with phosphorous oxychloride and water so as to chlorinate the same; and reducing the thus-chlorinated compound with hydrogen utilizing palladium and calcium carbonate as catalyst so as to form dictamine.

6. A method of producing a dictamine, comprising the steps of heating

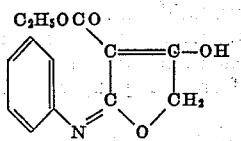

distributed in a substance selected from the group consisting of paraffin oil and diphenylether at a temperature of about 270–300° C. so as to cause ring closure and splitting off of ethanol; treating the thus-formed closed ring compound with diazomethane so as to methylate the same, thereby forming the corresponding O-methyl and N-methyl compounds; separating said O-methyl compound from said N-methyl compound by sublimation; treating the thus-separated N-methyl compound with phosphorous oxychloride and water so as to chlorinate the same; and reducing the thus-chlorinated compound with hydrogen utilizing palladium and calcium carbonate as catalyst so as to form isodictamine.

7. A method of producing a γ-fagarine, comprising the steps of heating

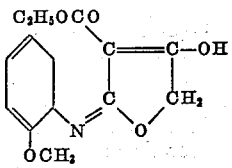

at a temperature of 305° C. so as to cause ring closure and splitting-off of ethanol; treating the thus-formed closed ring compound with diazomethane so as to methylate the same; treating the thus-methylated compound with phosphorous oxychloride and water so as to chlorinate the same; and reducing the thus-chlorinated compound with hydrogen utilizing palladium and calcium carbonate as catalyst so as to form the corresponding γ-fagarine.

References Cited in the file of this patent

Manske: The Alkaloids, vol. III, pp. 69–75, 1953, Academic Press, N.Y.